United States Patent
Isono

(10) Patent No.: US 11,243,130 B2
(45) Date of Patent: Feb. 8, 2022

(54) FORCE SENSOR AND FORCE SENSOR MANUFACTURING METHOD

(71) Applicant: National University Corporation Kobe University, Hyogo (JP)

(72) Inventor: Yoshitada Isono, Hyogo (JP)

(73) Assignee: NATIONAL UNIVERSITY CORPORATION KOBE UNIVERSITY, Hyogo (JP)

( * ) Notice: Subject to any disclaimer, the term of this patent is extended or adjusted under 35 U.S.C. 154(b) by 554 days.

(21) Appl. No.: 16/332,677

(22) PCT Filed: Aug. 14, 2017

(86) PCT No.: PCT/JP2017/029290
§ 371 (c)(1),
(2) Date: Mar. 12, 2019

(87) PCT Pub. No.: WO2018/051703
PCT Pub. Date: Mar. 22, 2018

(65) Prior Publication Data
US 2021/0285834 A1 Sep. 16, 2021

(30) Foreign Application Priority Data
Sep. 14, 2016 (JP) .............................. JP2016-179650

(51) Int. Cl.
*G01L 5/16* (2020.01)
*G01L 5/1627* (2020.01)
*G01L 1/22* (2006.01)

(52) U.S. Cl.
CPC .............. *G01L 5/16* (2013.01); *G01L 1/2287* (2013.01); *G01L 5/1627* (2020.01)

(58) Field of Classification Search
CPC ...... H01C 10/10; H01C 10/12; H01C 10/103; G01L 5/16; G01L 5/1627; G01L 5/161;
(Continued)

(56) References Cited

U.S. PATENT DOCUMENTS 4,916,426 A * 4/1990 Yajima .................. G01L 9/0055
338/4
5,068,635 A * 11/1991 Yajima .................... G01L 9/006
338/42

(Continued)

FOREIGN PATENT DOCUMENTS

| JP | 2-75925 | 3/1990 |
| JP | 2001-4656 | 1/2001 |

(Continued)

OTHER PUBLICATIONS

International Search Report (ISR) dated Nov. 7, 2017 in International (PCT) Application No. PCT/JP2017/029290.

*Primary Examiner* — Kyung S Lee
(74) *Attorney, Agent, or Firm* — Wenderoth, Lind & Ponack, L.L.P.

(57) ABSTRACT

A force sensor that is a MEMS sensor includes: a plurality of detectors arranged in a circle and each including an element disposed in part of a surface layer of a base component including a semiconductor; an elastic component including resin and disposed sandwiching the plurality of detectors from both sides; and a probe that is connected to an end of each of the plurality of detectors at a center portion of the circle in which the plurality of detectors are arranged, extends up to a position that protrudes from the elastic component, and to which force is applicable directly without passing the elastic component.

6 Claims, 6 Drawing Sheets

(58) Field of Classification Search
CPC ......... G01L 5/171; G01L 5/173; G01L 5/167; G01L 5/169
See application file for complete search history.

(56) References Cited

U.S. PATENT DOCUMENTS

| | | | | |
|---|---|---|---|---|
| 5,279,162 | A * | 1/1994 | Takebe | G01P 15/0802 257/26 |
| 9,134,189 | B2 * | 9/2015 | Hata | G01L 1/144 |
| 9,851,266 | B2 * | 12/2017 | Nakamura | G01L 1/16 |
| 2002/0190949 | A1 * | 12/2002 | Hirano | G06F 3/0338 345/161 |
| 2004/0045372 | A1 * | 3/2004 | Liu | G01L 1/22 73/862.041 |
| 2005/0190152 | A1 * | 9/2005 | Vaganov | G06F 3/0338 345/157 |
| 2009/0044639 | A1 | 2/2009 | Maekawa | |
| 2013/0187201 | A1 | 7/2013 | Elian et al. | |
| 2014/0144252 | A1 * | 5/2014 | Kim | G01L 1/26 73/862.338 |

FOREIGN PATENT DOCUMENTS

| | | |
|---|---|---|
| JP | 2006-275979 | 10/2006 |
| JP | 2011-169749 | 9/2011 |
| JP | 2015-87131 | 5/2015 |
| WO | 03/087750 | 10/2003 |
| WO | 2015/143281 | 9/2015 |

* cited by examiner

FORCE SENSOR AND FORCE SENSOR MANUFACTURING METHOD

TECHNICAL FIELD

The present invention relates to a force sensor that detects the amount and direction of applied force, and to a force sensor manufacturing method.

BACKGROUND ART

Conventionally, there are tactile sensors that are mounted on a relatively large machine element such as the surface of a robot hand. Such tactile sensors need to be distributed widely over the surface of the robot hand, and thus miniaturization is being carried out through microelectromechanical systems (MEMS).

For example, a tactile sensor described in Patent Literature (PTL) 1 is a sensor capable of detecting force in three axis directions using one element, and is formed on a square substrate having sides that are approximately 0.5 mm. Furthermore, such a tactile sensor has a relatively narrow detection range and detects relatively strong force.

CITATION LIST

Patent Literature

[PTL 1] Japanese Unexamined Patent Application Publication No. 2015-87131

SUMMARY OF INVENTION

Technical Problem

However, the tip of a guide wire of a minimally invasive medical catheter used for surgical operations is hemispherical with a diameter of 0.3 mm to 0.5 mm, for example, and thus mounting a conventional tactile sensor onto such tip was almost impossible.

Furthermore, detecting up to minute forces, realizing a wide detection range, and detecting force in three axial directions using one element is difficult with the conventional tactile sensor.

The present invention is conceived in view of the aforementioned problems and has an object to provide a force sensor capable of being attached to a minute part and three-dimensionally detecting up to a minute force over a wide detection range, and a force sensor manufacturing method.

Solution to Problem

In order to achieve the aforementioned object, a force sensor according to the present invention is a force sensor that is a microelectromechanical systems (MEMS) sensor, and includes: a plurality of detectors arranged in a circle, each of the plurality of detectors including an element disposed in part of a surface layer of a base component including a semiconductor; an elastic component including resin and disposed sandwiching the plurality of detectors; and a probe that is connected to an end of each of the plurality of detectors at a center portion of the circle in which the plurality of detectors are arranged, extends up to a position at which the probe protrudes from the elastic component, and to which force is applicable directly without passing the elastic component.

Accordingly, when force is applied directly to the probe connected to the connected to one end of the detectors in a protruding state, without the force passing the elastic component, the detectors distort and signals can be received from the elements in accordance with the amount of distortion. Therefore, when the detectors are miniaturized and made thin, it is possible to detect up to extremely minute force. On the other hand, since the detectors are sandwiched by the elastic component, it is possible to supplement the structural strength of the miniaturized detectors, and thus it is possible to the detectors can be mitigated even when a strong force is applied to the probe. In addition, since the amount of distortion of the detectors relative to the force applied to the probe can be regulated by the elastic force of the elastic component, the force detection range can be widened.

Furthermore, the force sensor may further include a holder connected to an other end of each of the plurality of detectors at a peripheral portion of the circle in which the plurality of detectors are arranged; and a terminal connected to the holder on a side of the holder which is opposite to a side on which the probe is located, wherein the terminal may include, in a portion facing the plurality of detectors, a recessed portion housing part of the elastic component, and a through-hole communicating with the recessed portion.

Accordingly, since signals can be retrieved from the end of the probe which is opposite to the protruding direction of the probe, the force sensor can be attached to the tips of narrow components such as wires without obstruction by signal transfer lines.

Furthermore, in each of the plurality of detectors, the element may be disposed on a side of the detector which is opposite to a side on which the probe is located.

Accordingly, the detectors and the probe can be formed integrally, that is, attaching a separate probe to the detectors is not required, and thus occurrence of manufacturing error can be reduced.

Furthermore, the force sensor may further include a cover attached to the probe to cover the probe.

Accordingly, by covering the probe, chemical properties such as biocompatibility can be added to the probe. Furthermore, by covering the pointed probe, harming of the measurement target can be prevented.

Furthermore, in order to achieve the aforementioned object, a force sensor manufacturing method according to the present invention is a method for manufacturing a force sensor that is a microelectromechanical systems (MEMS) sensor, and the method includes: forming a plurality of detectors arranged in a circle, each of the plurality of detectors including an element disposed in part of a surface layer of a base component including a semiconductor; forming a partitioning hole penetrating in a thickness direction in the base component, between neighboring detectors among the plurality of detectors; forming a probe that is protruding in shape and connected to an end of each of the plurality of detectors at a center portion of the circle in which the plurality of detectors are arranged; electrically and mechanically connecting a terminal to a holder connected to an other end of each of the plurality of detectors at a peripheral portion of the circle in which the plurality of detectors are arranged, the terminal being connected on a side of the holder which is opposite to a side on which the probe is located; and forming an elastic component by filling, with a resin, a recessed portion provided in a portion of the terminal which faces the plurality of detectors, arranging the resin to sandwich the plurality of detectors via the partitioning hole, and curing the resin, the recessed portion being filled using a through-hole that communicates with the recessed portion.

Accordingly, a force sensor capable of being attached to the tip of a narrow component such as a wire can be easily manufactured.

Furthermore, the method of manufacturing a force sensor may further include attaching a cover to the probe before filling the recessed portion with the resin, the cover regulating the flow of the resin.

Accordingly, resin leaking out past the detectors can be restricted to a predetermined position, and thus it is possible to make the thickness of the elastic component sandwiching the detectors even, and thus make performance uniform between force sensors as products.

Advantageous Effects of Invention

According to the present invention, it is possible to provide a force sensor capable of being attached to a minute part and three-dimensionally detecting up to a minute force over a wide detection range, and to easily manufacture the force sensor.

DESCRIPTION OF EMBODIMENTS

Next, a force sensor and a force sensor manufacturing method according to the present invention will be described with reference to the drawings. It should be noted that the subsequent embodiment merely illustrates an example of a force sensor and a force sensor manufacturing method according to the present invention. Therefore, the scope of the present invention is defined by the recitations in the Claims, with reference to the subsequent embodiment, and is not limited to only the subsequent embodiment. Therefore, among the structural elements in the subsequent embodiment, structural elements not recited in any one of the independent claims defining the most generic part of the present invention are not necessarily required to overcome the object of the present invention, but are described as structural elements of a more preferable form.

Furthermore, the drawings are schematic diagrams in which highlighting, omission, or adjustment of proportions have been carried out as necessary in order to describe the present invention, and thus may differ from the actual shapes, positional relationships, and proportions.

Figure 1:
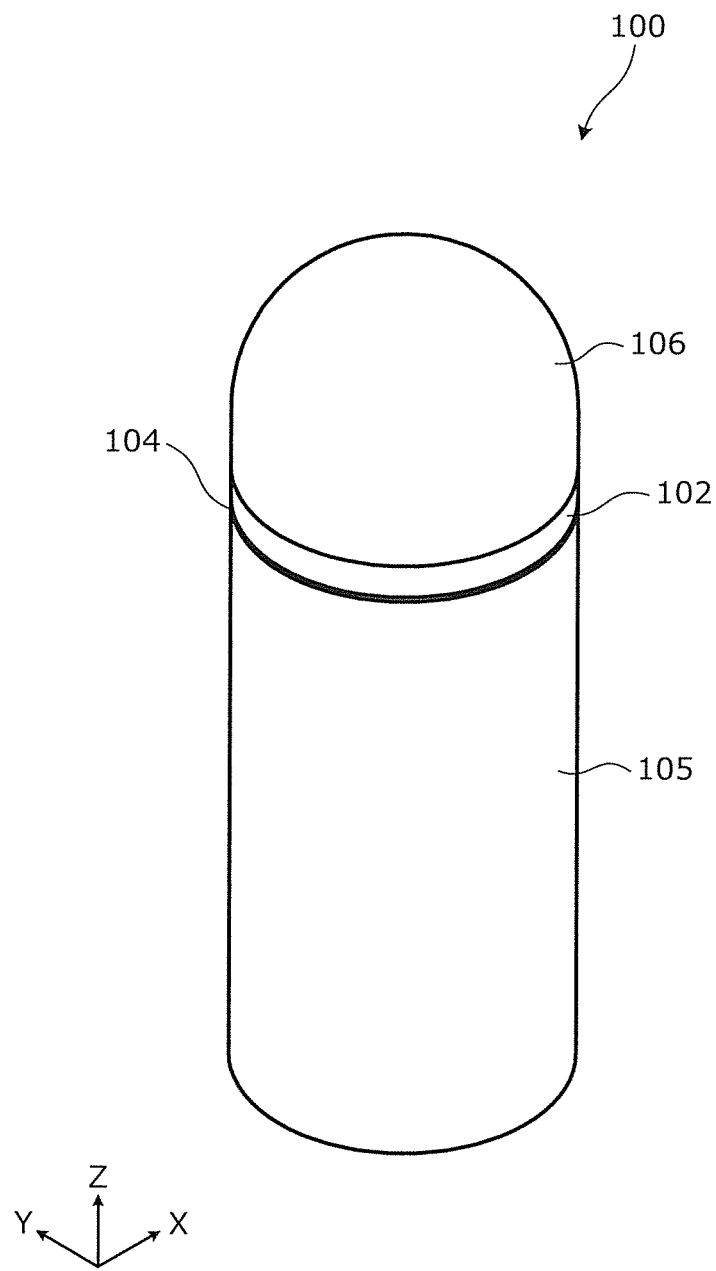
FIG. 1 is a perspective view of a force sensor.
Figure 2:
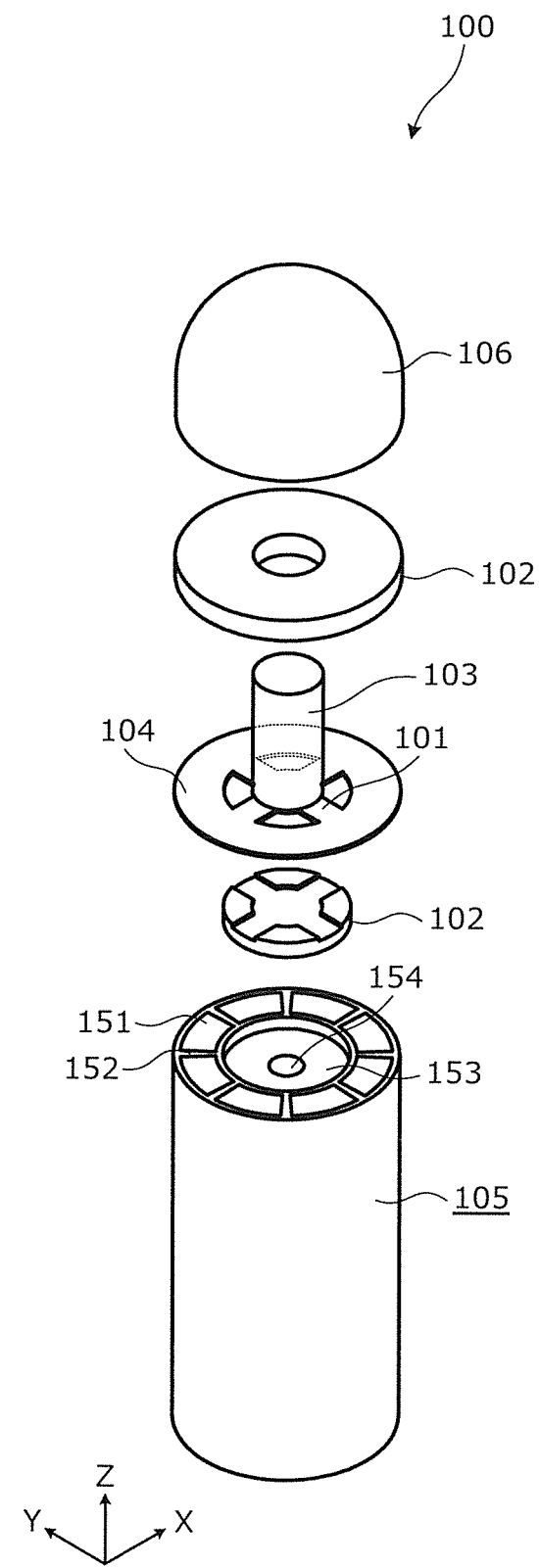
FIG. 2 is an exploded perspective view of the force sensor.

FIG. 1 is a perspective view of a force sensor.
FIG. 2 is an exploded perspective view of the force sensor.

As illustrated in these figures, a force sensor 100 is what is called a microelectromechanical systems (MEMS) sensor that is manufactured using micro-fabrication techniques such as photolithography and has both a mechanical structure and an electrical element structure, and includes detectors 101, an elastic component 102, and a probe 103. In this embodiment, the force sensor 100 includes a holder 104, a terminal 105, and a cover 106.

Figure 3:
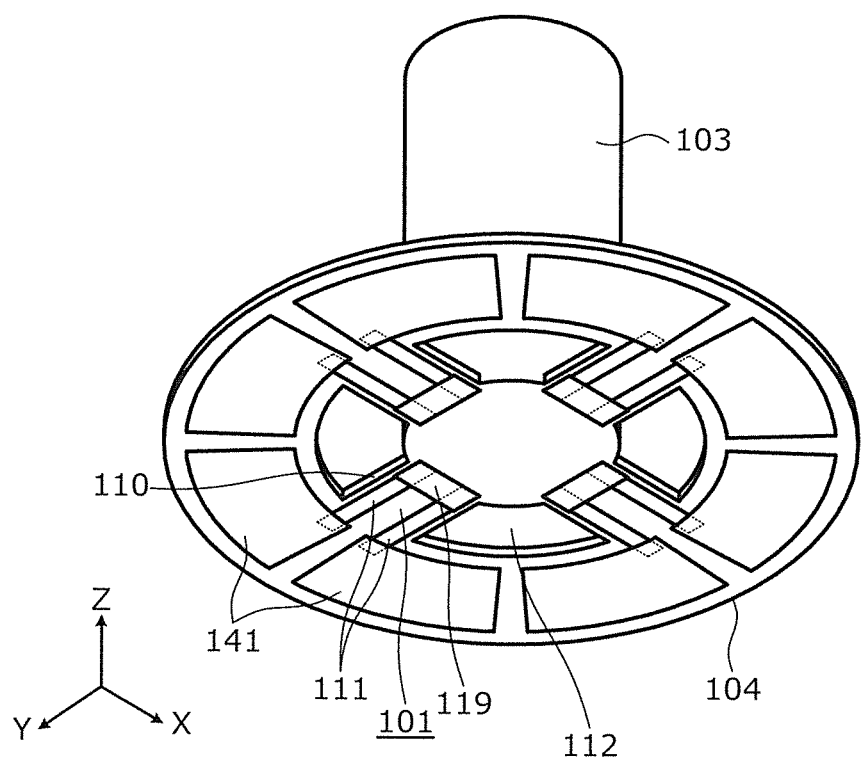
FIG. 3 is a perspective view of detectors together with a probe and a holder as seen from the bottom.

FIG. 3 is a perspective view of the detectors together with the probe and the holder as seen from the bottom.

As illustrated in the figure, each of detectors 101 is a component that includes elements 111 disposed in part of a surface layer of a base component 110 formed from a semiconductor, and distortion due to elastic deformation of the detector 101 is converted into electric signals by the elements 111. Furthermore, the detectors 101 are disposed approximately evenly in a circle. Accordingly, the direction of force applied to the probe 103 can be three-dimensionally identified by processing the signals obtained from the elements 111 of the respective detectors 101, and the amount of force can be obtained.

It should be noted that it is sufficient that the number of the detectors 101 be at least three and, in this embodiment, force sensor 100 includes four of the detectors 101 in a radial pattern. Furthermore, a wire component 119 in the form of a film for electrically connecting one end of an element 111 to a corresponding one end of the neighboring element 111 is formed on the surface of each of the detectors 101.

Elements 111 are capable of converting the distortion of the detector 101 into electric signals. In this embodiment, each element 111 is a part that exhibits a piezoresistive effect, and is formed in a surface layer of the base component 110 by doping with a chemical element (impurity) different from the chemical element included in the base component 110. It should be noted that the method of forming the elements 111 is not particularly limited, and a method that causes thermal diffusion of an impurity into the surface layer of the base component 110 or a method of implanting an impurity into the base component 110 by ion injection can be given as examples.

In this embodiment, elements 111 are provided in a band shape at two locations in the width direction of the detector 101, and each extends from one end to another end of the detector 101. Accordingly, it is possible to mainly detect distortion of the detectors 101 in a radial direction about the probe 103.

Furthermore, the detectors 101 are formed by microfabrication on a single semiconductor substrate, and a partitioning hole 112 penetrating in the thickness direction is provided between neighboring detectors 101 to enable the detectors 101 to detect distortion independently of each other.

Probe 103 is a part that is disposed connected to one end of each of the detectors 101 at the center portion of the circle in which the detectors 101 are arranged. In this embodiment, probe 103 is a columnar part erected perpendicular to the plane on which the four detectors 101 are disposed, and protrudes toward the side which is opposite to the surface on which the elements 111 are provided. The length of the probe 103 is not particularly limited, and is a length sufficient for the probe 103 to protrude (i.e., be exposed) from the elastic component 102 disposed so as to sandwich the detectors 101. Furthermore, in this embodiment, since the probe 103 and the detectors 101 are formed integrally by microfabrication on a single semiconductor substrate, the length of the probe 103 is dependent on the thickness of the semiconductor substrate prior to fabrication.

The holder 104 is a part that is connected to the other ends of the detectors 101 at the peripheral portion of the circle along which the detectors 101 are disposed, and holds the detectors 101. In this embodiment, the holder 104 is an annular component disposed in the plane in which the four detectors 101 are disposed. Furthermore, in this embodiment, the base component 110 of the detectors 101 and the holder 104 are formed integrally by micro-fabrication on a single semiconductor substrate.

Furthermore, electrodes 141 in film form are formed on a surface of the holder 104 so as to be connected to the ends of both elements 111 provided on each of the detectors 101. Each of the electrodes 141 is a component for leading the electric signal generated by the element 111 to the outside.

Figure 4:
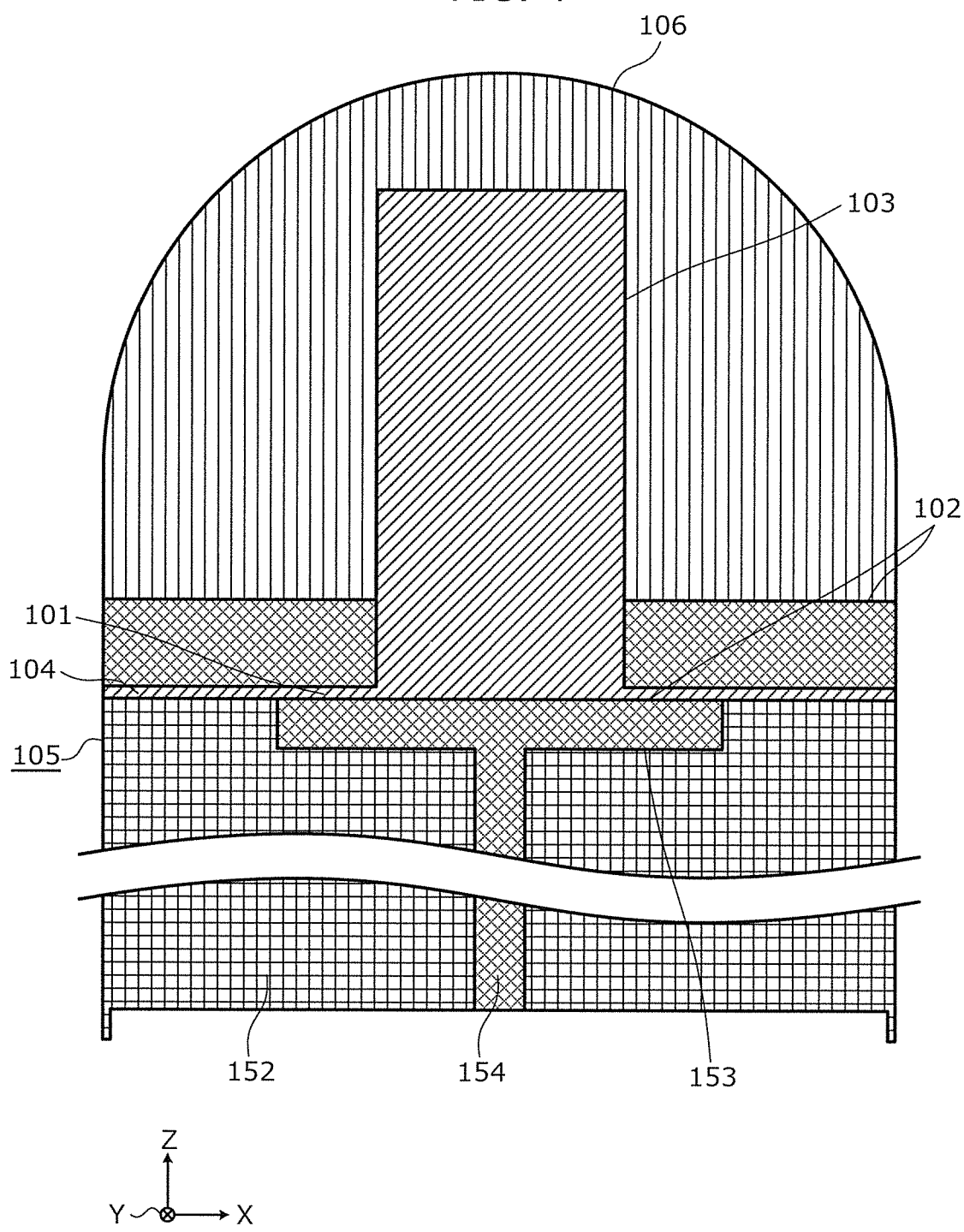
FIG. 4 is a cross-sectional view of the force sensor.

FIG. 4 is a cross-sectional view of the force sensor.

Figure 5:
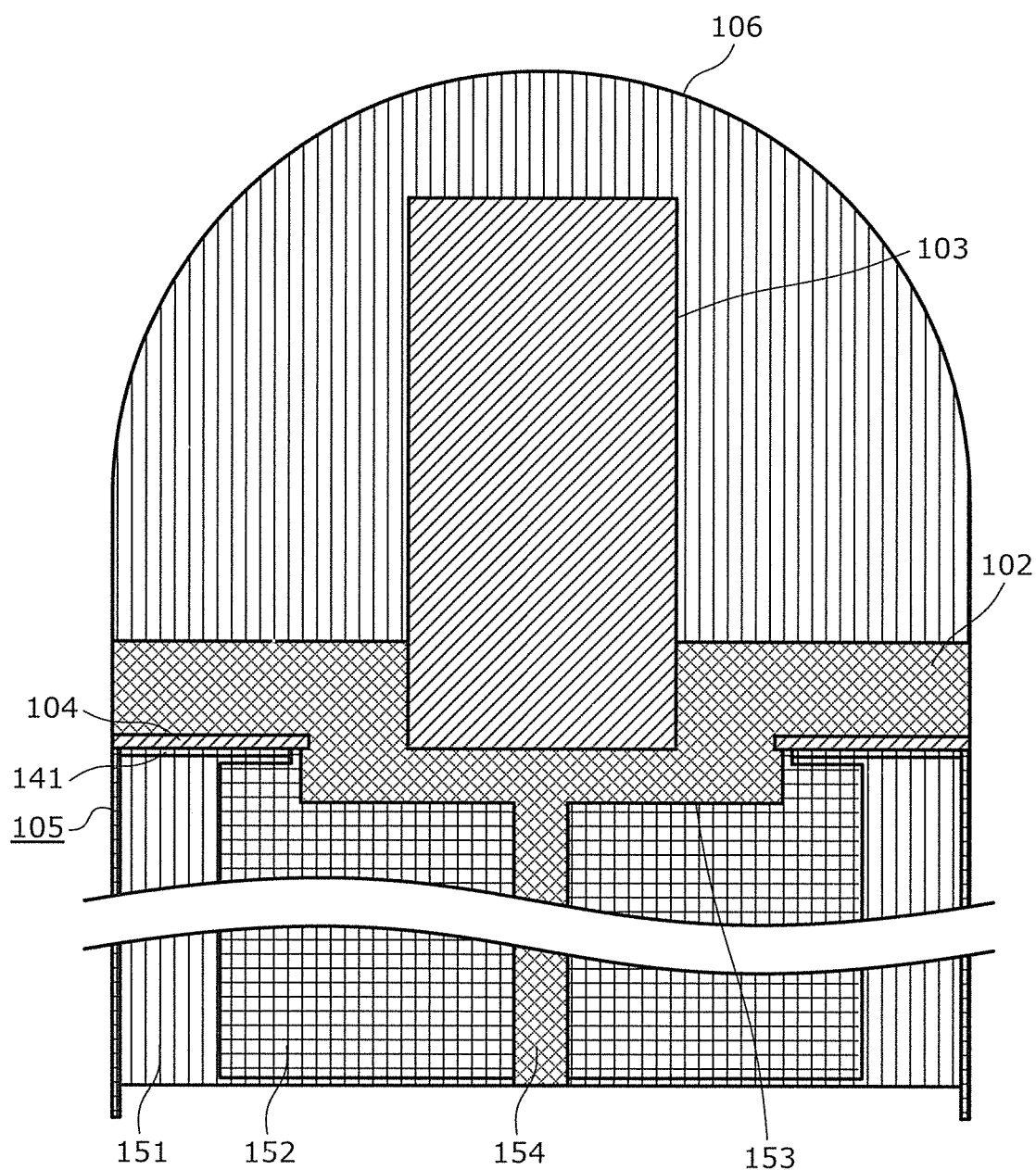
FIG. 5 is a cross-sectional view taken 45 degrees from the cross-section in FIG. 4.

FIG. 5 is a cross-sectional view taken 45 degrees from the cross-section in FIG. 4.

As illustrated in these figures, the elastic component 102 is a component that sandwiches the detectors 101 from the surface on which the elements 111 are formed and the surface on the side at which the probe 103 protrudes, and is formed from an elastic resin. In this embodiment, the elastic component 102 is formed integrally via the partition holes 112 provided between neighboring detectors 101. The shape of the elastic component 102 and the material forming the elastic component 102 are not particularly limited, and may be determined as appropriate according to the amount of force to be detected, the detection range, etc. Specifically, the amount of distortion of the detectors 101 generated by the application of force to the probe 103 is regulated by the Young's modulus, etc., of the elastic component 102 disposed sandwiching the detectors 101. As a resin, specifically, an acrylic resin, a silicon resin such as dimethylpolysiloxane, and also elastomers, can be given as examples.

The cover 106 is a component that is attached to the probe 103 to cover the probe 103. The cover 106 covers the relatively pointed probe 103 formed by micro-fabrication, and blocks the probe 103 from special environments such as the inside of a living body. The shape and material of the cover 106 is not particularly limited but it is preferable for the cover 106 to have a rigidity that allows applied force to be communicated to the probe 103 and to have no pointed portions.

In this embodiment, the cover 106 is shaped like an artillery shell with a domed tip, and is formed using a resin having higher rigidity than at least the elastic component 102. Furthermore, the cover 106 is attached to probe 103 in a state where the cover 106 is in contact with the surface of the elastic component 102 on the opposite side of the detectors 101. Accordingly, since the elastic force of the elastic component 102 can oppose the force applied to the cover 106, it is possible to avoid damage to the detectors 101 even when a strong force is unintentionally applied to the cover 106.

The terminal 105 is a component that is connected to holder 104 on the side which is opposite to the side on which the probe 103 is located, mechanically supports the detectors 101 and the probe 103 via the holder 104, and leads the electric signals generated by the terminals 111 along the extension direction of the probe 103 in a direction opposite to the protruding direction of the probe 103. In this embodiment, the terminal 105 includes conducting portions 151, an insulating portion 152, a recessed portion 153, and a through-hole 154.

The conducting portions 151 are parts that are electrically connected to the electrodes 141 provided on a surface of holder 104, and lead the electric signals of the elements 111 up to the end on the opposite side of terminal 105. In this embodiment, the elements 111 are disposed at four locations, and thus the conducting portions 151 disposed at eight locations arranged in a circle inside terminal 105. The shape of conducting portions 151 is not particularly limited but the shape on the side of the terminal 105 is the same as the shape of terminal 105 in order to increase the contact area, and the shape on the opposite side is such that the area is increased as much as possible while keeping the conducting portions 151 mutually insulated in order to facilitate connection with a wire-shaped conductor.

The insulating portion 152 is a component for holding the conducting portions 151 in a manner in which there is no conduction with each other, and holding the detectors 101 and the probe 103 at the tip via holder 104. The shape of the insulating portion 152 is not particularly limited and, in this embodiment, the shape of insulating portion 152 is cylindrical corresponding to the outer diameter of the annular holder 104, and is formed by the same micro-fabrication technique as the holder 104, etc. It is sufficient that the material of the insulating portion 152 be an insulator for the environment in which force sensor 100 is used. In this embodiment, the insulating portion 152 is formed from the same silicon semiconductor substrate as holder 104, etc.

The recessed portion 153 is a part that is recessed in a direction moving away from detectors 101, at the end of the insulating portion 152 which faces the detectors 101, and houses part of the elastic component 102 disposed sandwiching the detectors 101.

Through-hole 154 is a hole that is provided in the insulating portion 152, and communicates with the recessed portion 153. In this embodiment, the elastic component 102 is formed by the curing of a resin that is loaded through the through-hole 154, and thus the through-hole 154 is filled-in with the same resin as the elastic component 102.

According to the force sensor 100 according to this embodiment, the elastic component 102 covers, not only both surfaces of the detectors 101, but also the peripheral portions of the detectors 101, and thus the sensitivity of the detectors 101, which are formed by micro-fabrication so as to distort even with a small amount of force, can be regulated according to the Young's modulus of the elastic component 102, and the force detection range can be set to a wide range including a minute amount of force such as from 0.01 N to 5 N, for example.

Furthermore, even if a large external force is applied, damage to the detectors 101 can be mitigated because the detectors 101 are protected by the elastic component 102 and the cover 106 connected to the elastic component 102.

Furthermore, since the entirety of the force sensor 100 including terminal 105 is shaped like a thin rod (for example, at most 500 μm in diameter) and the probe 103 is disposed protruding at the tip, attachment to the tip of a catheter, or the like, to be inserted into a living body becomes easy.

Furthermore, since wires for connecting the force sensor 100 to a signal amplifier, or the like, can be connected at a position far from the detectors 101 by using the terminal 105, the wires which may obstruct force measurement can be distanced from the probe 103.

In addition, applied force can be three-dimensionally detected by the detectors 101, and thus vector information can be obtained using a single force sensor 100.

Next, a method of manufacturing the force sensor 100 will be described.

The force sensor 100 is, for example, at most 500 μm in diameter and at most 1000 μm in size overall, and micro-fabrication techniques used in fabricating semiconductor devices are used in manufacturing the force sensor 100.

In this embodiment, the detectors 101, the probe 103, and the holder 104 are formed from a single semiconductor substrate.

For the semiconductor substrate, what is called a silicon on insulator (SOI) substrate is used. This is a substrate in which a thin-film layer of silicon oxide is formed on the surfaces of a silicon layer. In this embodiment, a substrate having a four-layer structure in which a silicon oxide layer is also disposed in the middle portion of the silicon layer. The thickness of the silicon layer sandwiched by the separately-disposed silicon oxide layers becomes the thickness of the detectors 101 and the holder 104, and this portion is equivalent to the base component 110.

Next, a pattern for forming the elements 111 is formed on the silicon oxide layer formed on a surface of the semiconductor substrate by etching.

Next, the etched portions where the surface of the silicon layer is exposed is filled in with an element different from silicon (for example, germanium, etc.), and the element is caused to diffuse into the surface layer of the silicon layer by annealing. Accordingly, elements 111 exhibiting a piezoresistive effect are formed in the surface layer portion of the base component 110.

Next, wire components 119 and electrodes 141 are formed on the surface of the silicon oxide layer using a known technique.

Next, the holder 104, the partitioning holes 112, etc., are formed by dry etching such as reactive plasma etching, for example.

Next, etching in the shape of a donut is carried out on the base component 110 from the side which is opposite to the surface on which the elements 111 are formed, up to the silicon oxide layer disposed in the middle portion of the silicon layer to form the probe 103. Therefore, strictly speaking, the probe 103 and the detectors 101 are connected via the silicon oxide layer.

Meanwhile, terminal 105 is formed using a different SOI substrate.

The SOI substrate used in forming the terminal 105 is a substrate having a three-layer structure in which a silicon oxide film is formed on both surfaces of a silicon layer.

Etching is performed from both sides of the substrate (simultaneous etching not necessary) to form a plurality of through-holes (eight in this embodiment) arranged in a circle for filling in with the conducting portions 151. Furthermore, a recessed portion 153 is also formed at the same time.

Next, the through-holes that are formed are filled in with a conductor such as copper using a known technique. It should be noted that since the electrodes 141 provided in the holder 104 and the ends of the conductive portions 151 are connected by thermo-compression bonding using the wafer level chip size package (wafer level CSP) technique, the plane of the through-holes on the side connecting with the electrodes 141 is sealed by a component having a flat surface, and the conductor is loaded from the openings on the opposite side.

Next, the through-hole 154 is formed in the center portion of the terminal 105 by etching.

Thus, the terminal 105 is formed in the above-described manner.

Next, the terminal 105 and the detectors 101 are connected via the holder 104. The connection method is not particularly limited but the aforementioned wafer level CSP method is used.

Next, the cover 106 is attached to the terminal 105 using an adhesive, etc.

Next, the elastic component 102 is arranged between the cover 106 and the detectors 101, and in the peripheral portions of the detectors 101. Although the arrangement method is not particularly limited, in this embodiment, the elastic component 102 is formed by suctioning up resin that has been plasticized by heating, through the through-hole 154 to thereby fill in the recessed portion 153 provided in the terminal 105 with the resin, and further fill in the spaces between the detectors 101 and the cover 106 with the resin via the partitioning holes 112.

Thus, the force sensor 100 is manufactured in the above-described manner.

Furthermore, the force sensor 100 can be connected to a signal amplifier, etc., by performing wire bonding on the conducting portions 151 exposed at the end of the terminal 105 and carrying out wiring work.

It should be noted that the present invention is not limited to the above-described embodiment. For example, other embodiments that can be realized by arbitrarily combining structural elements described in the present Description or by removing some structural elements may be embodiments of the present invention. Furthermore, variations obtainable through various modifications to the above-described embodiment that can be conceived by a person of ordinary skill in the art without departing from the essence of the present invention, that is, the meaning of the recitations in the Claims are included in the present invention.

Figure 6:
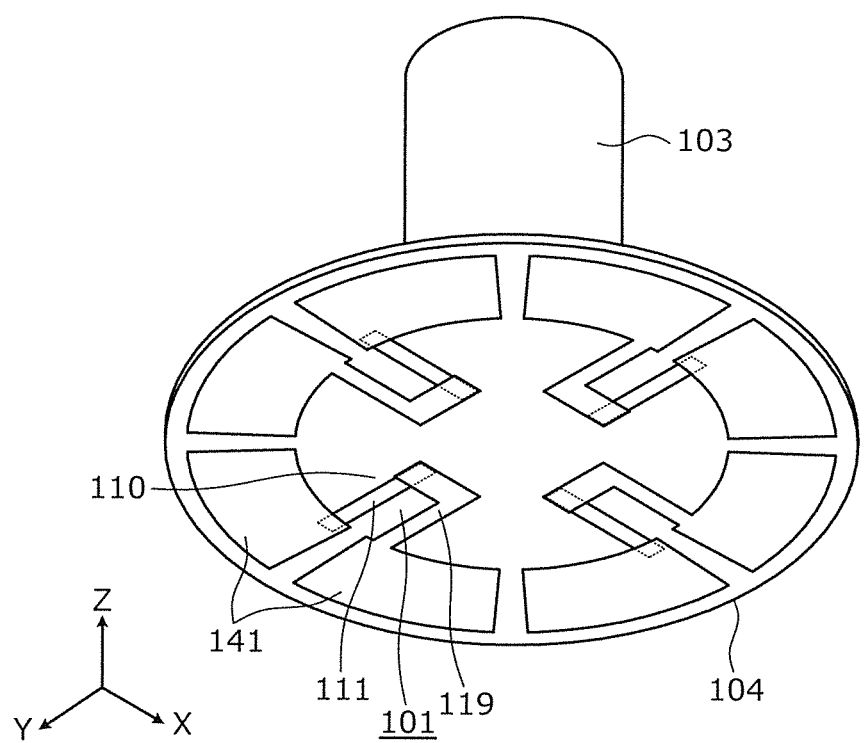
FIG. 6 is a perspective view of detectors together with a probe and a holder according to a variation, as seen from the bottom.

For example, although the case where two elements 111 connected in series are provided in a single detector 101 is described in the foregoing embodiment, the present invention is not limited to such, and a single element 111 can be provided to a single detector 101 as illustrated in FIG. 6.

Furthermore, it is also possible to have no partitioning hole 112 between the neighboring detectors 101, and a plurality of detectors 101 may be provided on a single diaphragm.

Furthermore, although the case where the detectors 101 and the probe 103 are integrally formed is described, a configuration in which separate bodies of the probe 103 and the detectors 103 are coupled is also acceptable.

Furthermore, wire bonding may be performed directly on the electrodes 141 provided in the holder 104, without using the terminal 105.

Furthermore, although the case of manufacturing the force sensor 100 based on a silicon substrate is described, as long as micro-fabrication is possible, the material is not limited to silicon.

INDUSTRIAL APPLICABILITY

A force sensor according to the present invention can be used in, for example, a minimally invasive medical catheter guide wire used for surgical operations, medical endoscopes, robot hands, etc.

The invention claimed is:

1. A force sensor that is a microelectromechanical systems (MEMS) sensor, the force sensor comprising:
 a plurality of detectors arranged in a circle, each of the plurality of detectors including an element disposed in part of a surface layer of a base component including a semiconductor;
 an elastic component including resin and disposed sandwiching the plurality of detectors; and
 a probe that is connected to an end of each of the plurality of detectors at a center portion of the circle in which the plurality of detectors are arranged, extends up to a position at which the probe protrudes from the elastic component, and to which force is applicable directly without passing the elastic component.

2. The force sensor according to claim 1, further comprising:
a holder connected to an other end of each of the plurality of detectors at a peripheral portion of the circle in which the plurality of detectors are arranged; and
a terminal connected to the holder on a side of the holder which is opposite to a side on which the probe is located, wherein
the terminal includes, in a portion facing the plurality of detectors, a recessed portion housing part of the elastic component, and a through-hole communicating with the recessed portion.

3. The force sensor according to claim 1, wherein
in each of the plurality of detectors, the element is disposed on a side of the detector which is opposite to a side on which the probe is located.

4. The force sensor according to claim 1, further comprising:
a cover attached to the probe to cover the probe.

5. A method for manufacturing a force sensor that is a microelectromechanical systems (MEMS) sensor, the method comprising:
forming a plurality of detectors arranged in a circle, each of the plurality of detectors including an element disposed in part of a surface layer of a base component including a semiconductor;
forming a partitioning hole penetrating in a thickness direction in the base component, between neighboring detectors among the plurality of detectors;
forming a probe that is protruding in shape and connected to an end of each of the plurality of detectors at a center portion of the circle in which the plurality of detectors are arranged;
electrically and mechanically connecting a terminal to a holder connected to an other end of each of the plurality of detectors at a peripheral portion of the circle in which the plurality of detectors are arranged, the terminal being connected on a side of the holder which is opposite to a side on which the probe is located; and
forming an elastic component by filling, with a resin, a recessed portion provided in a portion of the terminal which faces the plurality of detectors, arranging the resin to sandwich the plurality of detectors via the partitioning hole, and curing the resin, the recessed portion being filled using a through-hole that communicates with the recessed portion.

6. The method of manufacturing a force sensor according to claim 5, further comprising:
attaching a cover to the probe before filling the recessed portion with the resin, the cover regulating the flow of the resin.

* * * * *